(12) United States Patent
Kanai

(10) Patent No.: US 7,063,026 B1
(45) Date of Patent: Jun. 20, 2006

(54) WASTE CARBONIZING AND ENERGY UTILIZING SYSTEM

(76) Inventor: Masao Kanai, 18-10 Nagata-Sannodai, Minami-ku, Yokohama-shi, Kanagawa-ken (JP)

(*) Notice: Subject to any disclaimer, the term of this patent is extended or adjusted under 35 U.S.C. 154(b) by 0 days.

(21) Appl. No.: 11/010,213

(22) Filed: Dec. 10, 2004

(51) Int. Cl.
*F23B 7/00* (2006.01)
*C10J 3/54* (2006.01)

(52) U.S. Cl. .................. 110/341; 110/230; 48/197 R
(58) Field of Classification Search .............. 110/346, 110/230, 233, 234, 341; 48/111, 197 R
See application file for complete search history.

(56) References Cited

U.S. PATENT DOCUMENTS 4,541,345 A * 9/1985 Grumpelt et al. ............ 110/229
4,909,162 A * 3/1990 Vollhardt ..................... 110/234
6,379,629 B1 * 4/2002 Kanai ........................ 422/204

FOREIGN PATENT DOCUMENTS

JP           11-118124         4/1999

* cited by examiner

*Primary Examiner*—Kenneth Rinehart
(74) *Attorney, Agent, or Firm*—Howson and Howson

(57) ABSTRACT

A waste carbonizing and energy utilizing system comprises a carbonizer, a gasifying fusion furnace, and a power generation plant for utilizing heat energy. The carbonizer 20 carbonizes waste to generate charcoal. The gasifying fusion furnace incinerates the charcoal, and then the heat generated by the incineration of the charcoal is used for operation of the power generation plant. Exhaust heat from the power generation plant is recycled to the carbonizer.

6 Claims, 4 Drawing Sheets

Prior Art

WASTE CARBONIZING AND ENERGY UTILIZING SYSTEM

FIELD OF THE INVENTION

This invention relates to a waste carbonizing and energy utilizing system, and particularly to a system, comprising a carbonizer and a gasifying fusion furnace, which can be operated at low cost, and which is not affected by variations in the kind of waste to be treated, or by the moisture content of the waste material.

BACKGROUND OF THE INVENTION

In recent years, the volume of waste, such as municipal waste containing a large amount of raw garbage, has increased greatly, and it has become extremely difficult to secure adequate landfill space. The increase in waste has become a serious social problem, particularly in urban areas.

In order to solve this problem, and also to address other global environmental issues, systems which burn waste, and utilize the heat produced by its combustion, have been introduced.

FIG. 4 shows a waste gasification power generation system disclosed in Unexamined Japanese Patent Publication No. 118124/1999, which is one example of the above-mentioned combustion energy utilization systems.

In this waste gasification power generation system 100, waste 102 is fed from a waste supplier into a fluidized bed gasification furnace 101. Partially oxidized gas, generated in the gasification furnace 101, is sent from a gas discharge port to a cyclone separator 103, in which it is separated into not-yet-burnt char 105, dust 104, and combustible gas 120.

The not-yet-burnt char 105 is recycled, as a combustible, into the gasification furnace 101. The dust 104 is processed in an ash fusion furnace in the same way as the not-yet-burnt part. The combustible gas, from which the solid content has been separated, is introduced, through path 120, into a burner 110 through an air pre-heater (not shown). Part of air heated in the air preheater is sent into the burner 110, and the remainder is sent into an air scattering pipe (not shown) as fluidization air. The combustible gas, sent to the burner 110 through path 120, is burned, and generates combustion gas at a high temperature. The high temperature combustion gas generates steam in a boiler 111, and, after removal of dust by means of a bag filter 114, the gas is released to the atmosphere through a chimney 115 after going through an induced draft fan (not shown). Before the gas reaches the bag filter 114, slaked lime is added from a silo (not shown) to remove salt and reduce acidity. Steam, generated in the boiler 111, generates power by driving a steam turbine 113.

As waste is thrown directly into the conventional fusion furnace, a large amount of fuel oil was required in order to raise the temperature to 1500 degrees Celsius. In addition, because the internal pressure in the furnace is increased on order to produce fusion, the structure of the equipment becomes more complex.

The more complex equipment is very difficult to operate, and consequently it was necessary for the manufacturer to provide skilled operators, resulting in excessive labor cost.

Moreover, if the waste has a high moisture content, it is difficult to raise its temperature to 1500 degrees Celsius.

Thus, a conventional fusion furnace has a high equipment cost due to its complex structure, as well as a high operating cost due to excessive fuel requirements and the need for highly skilled labor.

The conventional fusion furnace eliminates dioxin generated from incinerated remainders such as bottom ash or fly ash by adsorbtion into activated carbon or slaked lime.

Consequently, wastes containing dioxin have continued to increase and have become a problem.

Moreover, although the waste power generating system 100 of FIG. 4 is designed to eliminate burnt ash in the cyclone separator 103, and to supply only gasified gas to the combustion furnace, the uptake efficiency of ash within the cyclone separator is around 90%, and therefore it is unavoidable that some ash will be carried into the boiler 111.

The burnt ash contains a large amount of chlorides (NaCl, KCl) and sulfates ($Na_2SO_4$, $K_2SO_4$), and furthermore, the combustion gas contains a large amount of HCl gas, for example, up to 1000 ppm. Intense high temperature corrosion occurs due to reaction between compounds having a low melting point below 500 degrees Celsius, and HCl contained in the gas within the heat exchanger within the boiler. Therefore, in the conventional waste power generation system the steam temperature is generally set to a low level, e.g. as low as below 400 degrees Celsius. This results in low power generation efficiency.

Attempts have been made to improve power generation efficiency by using a dedusting apparatus, filtration, or the like, between the furnace and the heat exchanger to increase the ash take-up efficiency in the combustion gas. However satisfactory results could not be obtained with these measures.

In addition, with the increasing call for effective use of resources in recent years, there has been a demand for the utilization of biomass. However, when using woody biomass such as scrap wood, or live biomass such as raw garbage, major problems were encountered, such as securing stable amounts, property changes, and high moisture content. In particular, although it is possible to secure stable collection of live biomass, as enormous amounts are disposed of, it is difficult to secure stable collection of woody biomass.

In view of the above problems, the invention combines a carbonizer and gasifying fusion furnace technology to provide a waste carbonizing and energy utilization system having high efficiency, and enables the utilization of all kinds of waste biomass, including raw garbage with a high moisture content, without producing burnt ash, which is a cause of intense high temperature corrosion.

SUMMARY OF THE INVENTION

The waste carbonizing and energy utilizing system in accordance with the invention comprises a carbonizer for producing charcoal by carbonizing waste, a gasifying fusion furnace arranged to receive and burn charcoal produced by the carbonizer, and a heat energy utilizing system, connected to the gasifying fusion furnace, for utilizing heat generated in the operation of the gasifying fusion furnace. A heat path recycles recycling exhaust heat from the heat energy utilizing system to the carbonizer for effecting carbonization of waste therein.

Preferably a combustion furnace is arranged to receive and incinerate carbonization gas generated from carbonization of waste in the carbonizer, and to introduce the incinerated carbonization gas into the gasifying fusion furnace.

The carbonizer preferably comprises a carbonization tank into which waste is introduced, and a jacket surrounding the carbonization tank for receiving a heating medium. The jacket and the interior of the carbonization tank are separated by a wall forming a heating surface within the carbonization tank. Rotating means, preferably fins, centrifugally urge the waste against the heating surface.

In the preferred embodiment of the invention, a plurality of carbonizers surround the gasifying fusion furnace.

No burnt ash is produced at the time of waste carbonization within the carbonizer. Consequently, generation of high temperature corrosion can be prevented. The elimination of high temperature corrosion enables incineration at high temperature, and therefore all kinds of waste biomass, including raw garbage with a high moisture content, can be used, and highly efficient energy utilization can be realized.

Moreover, because heat energy in the exhaust of the heat energy utilizing system is used for carbonization, it becomes unnecessary to use auxiliary fuel except at the early running phase and the time of reduction of output and thus, the system can be run at a relatively low operating cost.

DETAILED DESCRIPTION OF THE PREFERRED EMBODIMENTS

Figure 1:
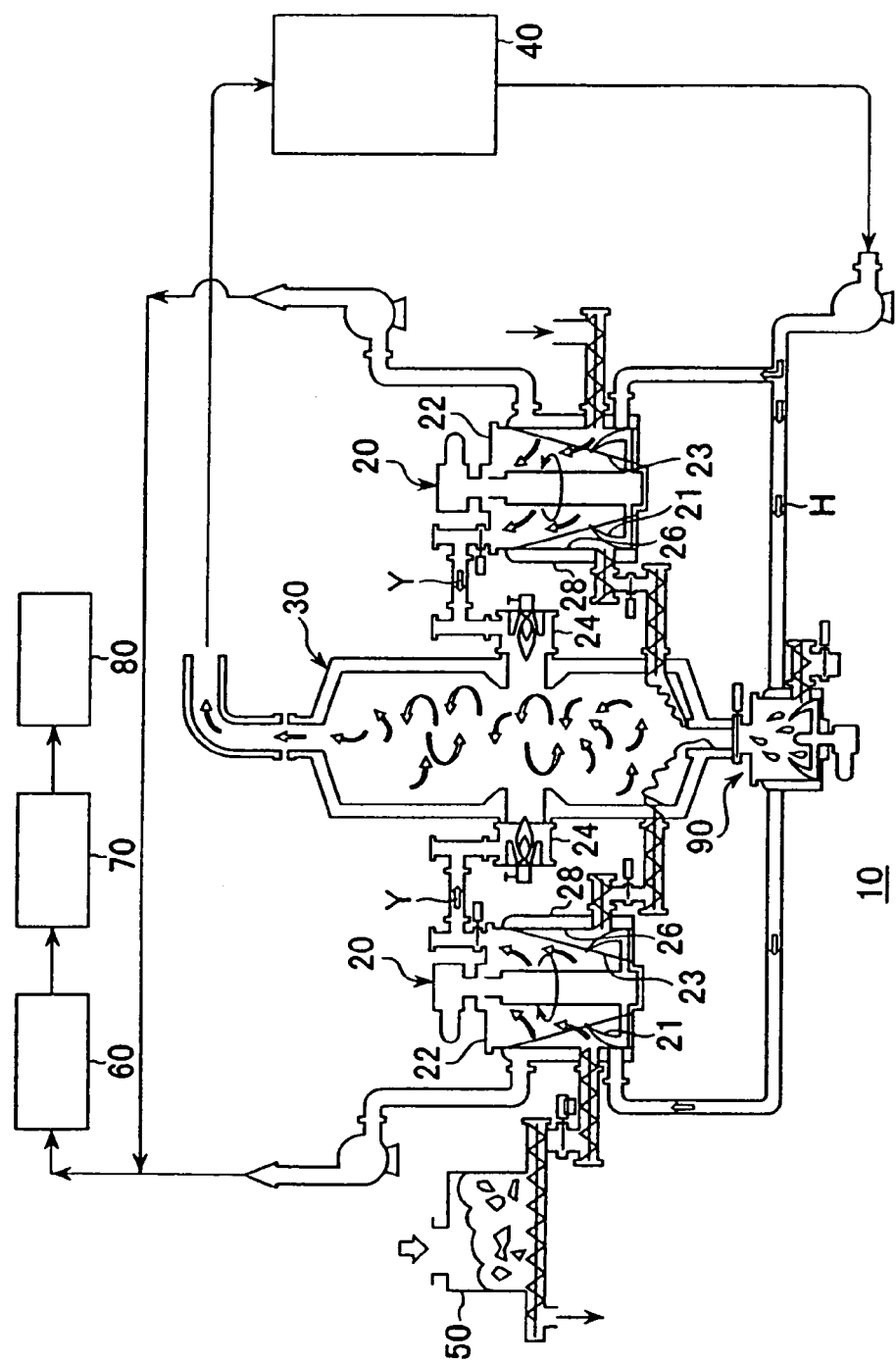
FIG. 1 is a schematic view of a waste carbonizing and energy utilizing system according to the invention.
Figure 2A:
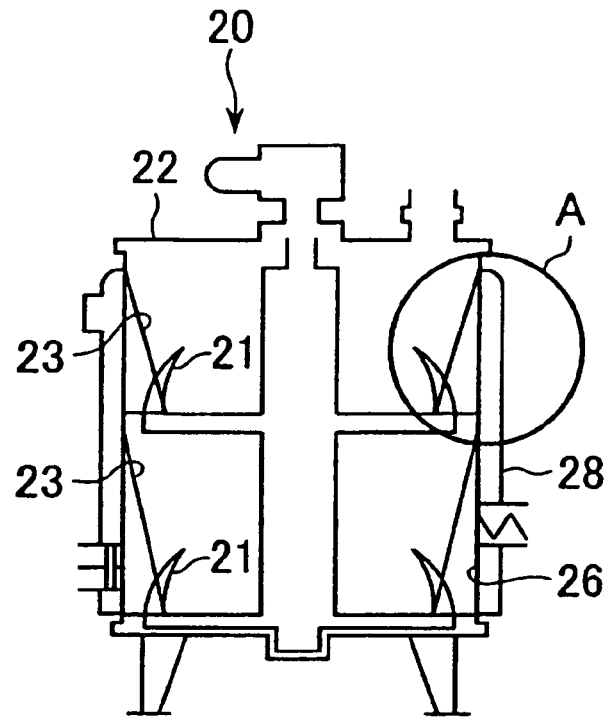
FIG. 2(a) is (a) is a cross-sectional view of a carbonizer.
Figure 2B:
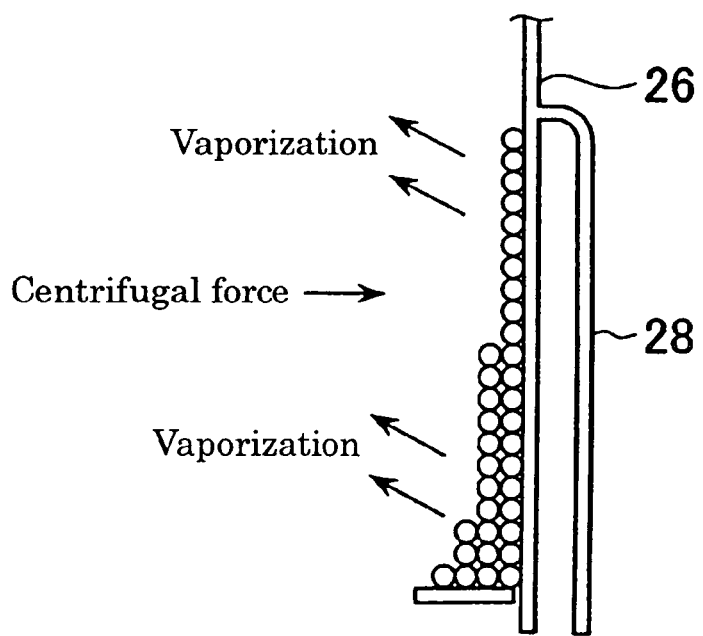
FIG. 2(b) is an enlarged cross-sectional view of a part of the carbonizer.

Referring to FIGS. 1, 2(a) and 2(b), the waste carbonizing and energy utilization system 10 according to the invention comprises a carbonizer 20, a gasifying fusion furnace 30 and a heat energy utilization apparatus 40, which, in the embodiment described, is a power generating plant.

The carbonizer 20 carbonizes waste to generate charcoal, the gasifying fusion furnace 30 burns the charcoal, and the power generation plant 40 utilizes the heat generated from the incineration to generate power. The system's operating cost is reduced by using the exhaust heat from the power generating plant for carbonization in the carbonizer 20.

The waste, which is collected by appropriate means, and may contain fluids or plastics, is fed from a waste supply hopper 50 into the carbonizer 20. In the carbonizer 20, the waste is dried and then carbonized. The carbonized waste is then fed into the gasifying fusion furnace 30.

A plurality of carbonizers 20 (e.g., four to six carbonizers) may be provided, in surrounding relationship, around one gasifying fusion furnace 30, and the waste which is converted to charcoal in the carbonizers is supplied from each of the carbonizers to the gasifying fusion furnace 30.

Carbonization gas, which is organic gas generated in the process of carbonization in the carbonizers 20, is incinerated within combustion furnaces 24, and then introduced into the gasifying fusion furnace 30. The reason for providing plural carbonizers around one gasifying fusion furnace is that carbonization is a batch process that typically takes place over an interval of from forty to sixty minutes. By feeding and discharging the several carbonizers in succession, the fusion furnace can be operated more smoothly, and smoother generation of power can be achieved.

The carbonized waste combusts explosively within the gasifying fusion furnace 30, and the temperature inside the furnace 30 can reach a level typically from 1250 to 1500 degree Celsius. In a lower part of the furnace, where carbide is combusted, the temperature can exceed 1500 degrees Celsius.

By utilizing the heat energy produced in the gasifying fusion furnace, power is generated by operation of a steam turbine in the power generation plant 40. The waste gas emitted by the power generation plant is recycled for carbonization in the carbonizers 20. The temperature of the gas introduced into the power generation plant 40 is typically from 1100 degrees Celsius to 1500 degrees Celsius, but the temperature of the exhaust heat recycled for carbonization is about 600 degrees Celsius.

The temperature of the exhaust gas from the carbonizers is lowered to about 200 degrees Celsius by a desuperheater 60, and the gas is released to the atmosphere from a chimney 80 after passing through a dust collector 70.

The functions of the gasifying fusion furnace 30 and the power generation plant 40 are well known to persons skilled in the art, and need not be described in detail.

The carbonizer 20, as shown in FIG. 2(a), can be an apparatus such as that disclosed in my U.S. Pat. No. 6,379,629, dated Apr. 30, 2002, the entire disclosure of which is incorporated by reference. Briefly, the carbonizer comprises comprising a carbonizing tank 22, and a jacket 28, to which a heating medium is supplied as a hot blast. A carbonizing tank heating surface 26, and optionally other inner surfaces, are heated by the heating medium. Cyclone fins 21, which rotate waste inside the carbonizer, push the waste centrifugally against the heating surface 26. Carbonization gas Y (FIG. 1), which is organic gas generated within the carbonizing tanks 22, is incinerated in combustion furnaces 24, and then introduced to the gasifying fusion furnace 30.

The heating medium heating the carbonizing tank heating surface 26 is a hot blast of exhaust or hot blast gas H from the heat energy utilization device 40. This exhaust gas arrives at the carbonizers at a temperature of around 600 degrees Celsius. After flowing through the carbonizing tank jackets 28, the gas is delivered to desuperheater 60, in which its temperature is reduced to around 200 degrees Celsius, and is released to the atmosphere from chimney 80 after passing through dust collector 70.

An important characteristic feature of the carbonizers 20 is the rotating fins 21 provided on the central lower part of the main body. As a result of the operation of the rotating fins, waste is pushed against the heating surface 26 of the carbonizing tank, and is pushed upward along surface 26, forming a thin film as shown in FIG. 2(b). Waste with a higher moisture content is preferentially pressed against the carbonizing tank heating surface 26 by centrifugal force. Waste which is heated, and has a reduced moisture content, moves to vaporization surfaces 23, which enhance vaporization.

In addition, with waste forming a thin film and contacting the carbonizing tank heating surface 26, the whole heating surface is utilized, the carbonizing tank heating surface 26 and the vaporization surface 23 being almost equal in area. At the same time, the contacting circumferential speed is as fast as 5 to 15 m/s, and therefore thermal efficiency improves by up to 4 to 6 times compared with that of the prior art. Moreover, the carbonizer 20 can rotate fluids such as slurries, causing them to contact the carbonizing tank heating surface 26 in the form of thin film.

Figure 3:
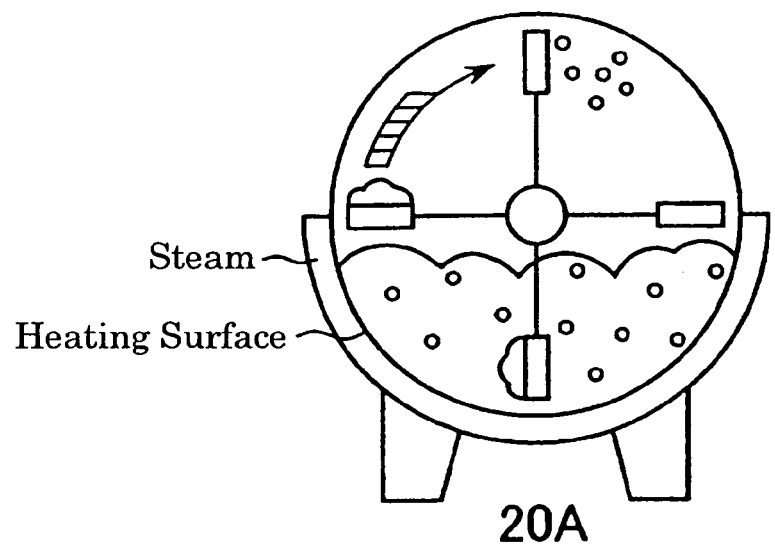
FIG. 3 is a schematic view of a conventional carbonizer.
Figure 4:
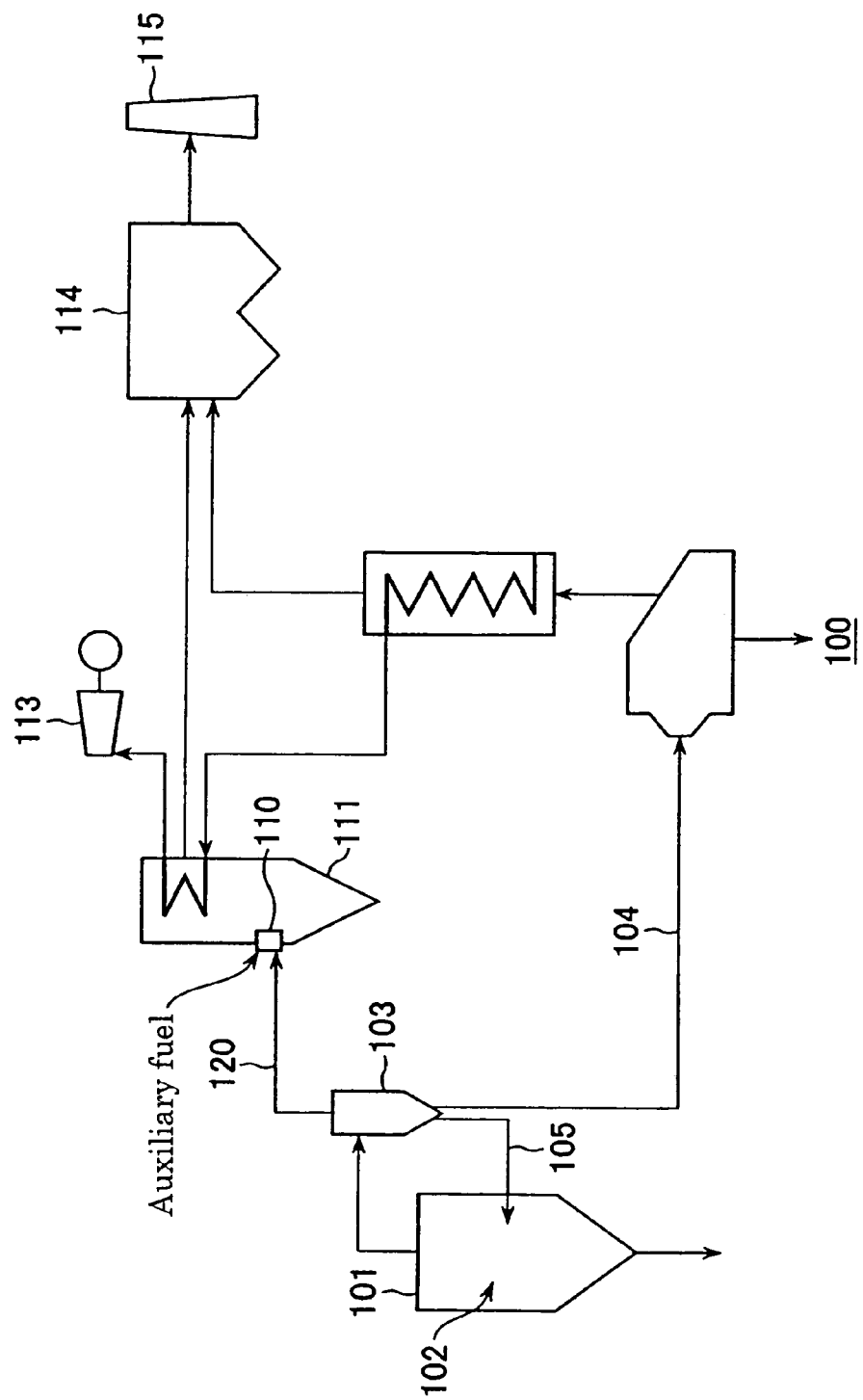
FIG. 4 is a schematic view of a conventional waste gasifying power generating system.

By contrast, with a conventional carbonizer (dryer) 20A as shown in FIG. 3, there is time difference between heating and vaporization. Consequently, the waste is not evenly vaporized, the heat contained in waste is not evenly radiated at the same time, and high carbonization efficiency cannot be realized.

The inside of the carbonizing tank 22 is kept essentially oxygen-free (the oxygen content being maintained at a level less than 1%). Therefore, no oxidation reaction takes place even when polyvinyl chloride, etc. is heated to 400 to 450 degrees Celsius. Chlorine bonded with polyvinyl chloride, or hydrogen bonded with benzene, are separately gasified respectively, and introduced to the combustion furnace 24. The channel to the combustion furnace 24 is also oxygen-free and carbon monoxide-free, and thus little oxidization takes place. Under these conditions, chlorides and hydrogen are instantly incinerated in the combustion furnace 24 at a temperature higher than 800 degrees Celsius, and no carbon monoxide is produced. Moreover, almost no dioxin is produced.

Since the temperature inside the gasifying fusion furnace 30 is kept at a level as high as 1250 to 1500 degrees Celsius, even if dioxin is produced at any stage of the process, it will be decomposed and rendered harmless.

With the carbonizer 20, the system according to the invention operates with high efficiency and at a low operating cost.

Although FIG. 1 shows single stage carbonizers, and FIG. 2 shows a two stage carbonizer, it is possible to utilize carbonizers having three or four stages.

As shown in FIG. 1, a cooler 90 is provided underneath the gasifying fusion furnace 30. The cooler has a similar structure to that of the carbonizer 20. Ash is produced in the cooler, after a slug formed by burning and melting charcoal is cooled down and collected. The volume of this waste is low in comparison with that of the waste thrown into the first stage. The waste discharged from the cooler may be utilized as roadbed material, for example.

As discussed above, according to the invention, no burnt ashes are produced at the time of waste carbonization in the carbonizer, and therefore high temperature corrosion can be prevented. In addition, since this enables incineration at high temperature, all kinds of waste biomass, including raw garbage having a high moisture content, can be utilized, and at the same time, high efficiency can be achieved.

Moreover, by recycling heat after energy utilization as a heat blast for carbonization in the carbonizer, the use of auxiliary fuel is not required, except at the early phase of operation, or at the time of reduction of output, and consequently operating costs can be kept relatively low.

The system according to the invention can solve a variety of problems such as the protection and effective utilization of natural resources, conservation of energy resources and protection of the environment, especially because it can utilize all kinds of waste biomass, including raw garbage having a high water content.

Various modifications can be made to the system of the invention in addition to those mentioned above. For example, the heat energy produced by the system may be utilized not only for power generation, but also for other purposes, such as operation of air-conditioning systems, etc.

I claim:

1. A method of treating waste comprising the steps of sequentially introducing batches of the waste into each of a plurality of carbonizers, producing charcoal by carbonizing each of said batches of waste in the carbonizer into which it is introduced; sequentially discharging batches of said charcoal from the carbonizers into a gasifying fusion furnace and burning said charcoal in the gasifying fusion furnace; utilizing heat energy produced by the operation of the gasifying fusion furnace in a heat energy utilizing system; and using exhaust heat from the heat energy utilizing system to carbonize waste in said carbonizers.

2. The method according to claim 1, in which the sequential introduction of batches of waste into the carbonizers and sequential discharge of batches of charcoal from the carbonizers is repeated, whereby a smooth generation of power can be achieved.

3. The method according to claim 2, in which said carbonizers are arranged in surrounding relationship to said fusion furnace.

4. The method according to claim 3, in which the number of said carbonizers is from four to six.

5. The method according to claim 1, including the step of incinerating carbonization gas generated from the carbonization of waste in said carbonizers, using at least one combustion furnace, and introducing the incinerated carbonization gas into said gasifying fusion furnace.

6. The method according to claim 1, including the step of incinerating carbonization gas generated from the carbonization of waste in said carbonizers, using at least one of a plurality of combustion furnaces for each of said carbonizers, each said combustion furnace receiving carbonization gas from one of said carbonizers, and introducing the incinerated carbonization gas into said gasifying fusion furnace.

* * * * *